Patented Feb. 6, 1951

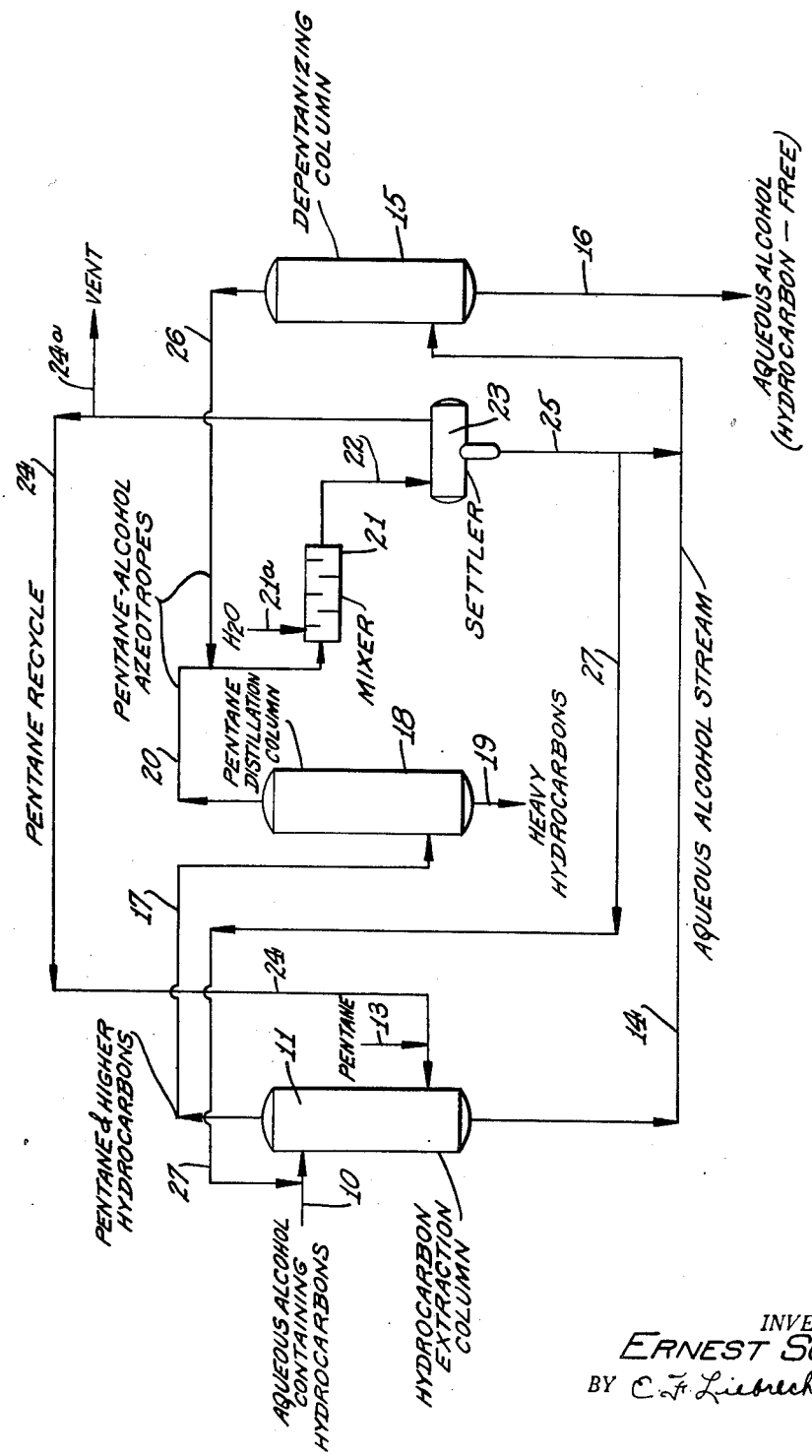

2,540,143

UNITED STATES PATENT OFFICE 2,540,143

SEPARATION OF ORGANIC COMPOUNDS

Ernest Solomon, Nutley, N. J., assignor to The M. W. Kellogg Company, Jersey City, N. J., a corporation of Delaware Application November 14, 1946, Serial No. 709,881

15 Claims. (Cl. 260—450)

This invention relates to the separation of organic compounds and relates more particularly to the separation of hydrocarbons from aqueous solutions of oxygenated organic compounds. Still more particularly, this invention relates to a process for the separation of dissolved hydrocarbon impurities from aqueous solutions of oxygenated organic compounds that form azeotropes with hydrocarbons where such compounds are present in the reaction product obtained in the catalytic hydrogenation of carbon monoxide.

In the separation of individual components from mixtures of oxygenated organic compounds, numerous methods are known to those skilled in the art. Where these mixtures consist of organic compounds such as alcohols, acids, esters, aldehydes, ketones and hydrocarbons obtained in the catalytic hydrogenation of carbon monoxide, a number of processes are known for the recovery of individual water-soluble oxygenated compounds present. For example, it is possible to effect separation of aldehydes, alcohols, esters and hydrocarbons from organic acids present. This may be followed by the removal of aldehydes and saponification of esters, leaving alcohols, ketones and some hydrocarbons in aqueous solution. However, difficulty is encountered in obtaining yields of hydrocarbon-free products utilizing such methods.

It is an object of this invention to provide an improved process for the efficient and economical separation of dissolved hydrocarbon impurities from aqueous solutions of oxygenated organic compounds that form azeotropes with hydrocarbons where such compounds comprise water-soluble oxygenated organic compounds containing a polar group, such as aqueous alcohol solutions, aqueous alcohol-ketone solutions, and aqueous ketone or acid solutions. Other objects and advantages of the invention will be apparent during the course of the following more detailed disclosure.

Considering aqueous alcohol solutions containing hydrocarbon impurities as representative of the class of aqueous solutions of oxygenated organic compounds containing a polar group that form azeotropes with hydrocarbons, it has been found in distillation cuts between the various alcohols that hydrocarbons present, boil over a very wide range and tend to concentrate as their homogeneous azeotropes. I have found that in such aqueous alcohol solutions, contaminating hydrocarbons can be removed efficiently and economically by means of one or more hydrocarbons, which are themselves readily removable.

In principal, the process may be considered as one of dilution rather than extraction, in that undesirable hydrocarbons are replaced by one or more of the aforementioned hydrocarbons. The process, therefore, has particular application to methods relating to the separation of oxygenated compounds from the reaction product obtained in the catalytic hydrogenation of carbon monoxide.

I have found that such a hydrocarbon may be a $C_5$ hydrocarbon such as normal pentane, which is highly suitable in overall use as a treating agent in accordance with the process hereinafter described. It should be noted, however, that the process is not restricted to the sole use of $C_5$ hydrocarbons for the purpose indicated, but that other lighter and heavier hydrocarbons boiling at a temperature within the range from about $-7°$ C. to about 160° C., individually or in mixtures thereof, may also be successfully employed such as butane, hexane or heptane. Butane has the advantage of not being known to form an azeotrope with methanol, although it has a higher solubility in aqueous alcohol solutions. On the other hand, it may be desirable to use heavier hydrocarbons as a solvent such as heptane, the latter being less soluble than pentane but requiring stripping of lighter hydrocarbons out of the heptane as well as stripping of heptane from the heavier hydrocarbons. Hydrocarbons higher boiling than heptane and boiling at a temperature within the range from about $-7°$ C. to about 160° C. may also be used as treating agents. The use of such hydrocarbons generally requires the distillation of large quantities of alcohol when the solvent hydrocarbons are being removed by distillation as alcohol azeotropes. The choice of a suitable hydrocarbon as a treating agent in the present process, will be influenced by its solubility and by its boiling point or the boiling points of its azeotropes with light alcohols. It should also be noted that the process is not restricted to the use of normal or iso-paraffin hydrocarbons but other classes of hydrocarbons such as olefins, naphthenes, or aromatics may be employed. In addition, a mixture of such hydrocarbons boiling at a temperature within the range from about $-7°$ C. to about 160° C. may also be employed as treating agents.

Using normal pentane as a typical hydrocarbon solvent treating agent for the removal of hydrocarbon impurities from aqueous alcohol solutions, the latter being representative of a group of aqueous solutions of oxygenated compounds that form azeotropes with hydrocarbons, the invention broadly comprises the steps of (A) separation of the aqueous alcohol stream in a hydrocarbon extraction column by countercurrent extraction with normal pentane, (B) stripping of pentane from heavy hydrocarbons in a pentane distillation column, (C) removal of pentane from the aqueous alcohol stream by distillation in a depentanizing column, (D) combining the distillate (pentane-alcohol azeotrope) from the depentanizing column with the distillate from the pentane distillation column, and water-washing the mixture thus obtained to recover hydrocarbon-free alcohols and (E) recycling of pentane obtained from the water-washing step for further use as a solvent treating agent.

The accompanying drawing illustrates diagrammatically one form of the apparatus employed and capable of carrying out the process of this invention. The invention will be described in detail by reference to a process employing the apparatus illustrated in the drawing, but it should be noted that it is not intended that the invention be limited to the embodiment as illustrated but is capable of other embodiments which may extend beyond the scope of the apparatus illustrated in the drawing. Furthermore, the distribution and circulation of the liquids and vapors is illustrated in the drawing by diagrammatic representation of the apparatus employed. The valves, pumps, compressors and other mechanical elements necessary to effect the transfer of liquids and vapors and to maintain the conditions of temperature and pressure necessary to carry out the function of the apparatus are omitted, in order to simplify the description. It will be understood, however, that much equipment of this nature is necessary and will be supplied by those skilled in the art.

Referring to the drawing, an aqueous alcohol solution containing hydrocarbons and representative of the group of aqueous solutions of oxygenated organic compounds that form azeotropes with hydrocarbons, is introduced through line 10 to an upper point in an extraction column 11. In column 11 the aqueous alcohol solution is subjected to intimate countercurrent extraction with a hydrocarbon solvent treating agent. Such treating agent may be pentane or other selected suitable hydrocarbon or mixture of hydrocarbons. This pentane treating agent is introduced at a low point in column 11 through line 24. Column 11 is operated under conditions effective to absorb in the treating agent substantially all the hydrocarbons present. The extract thus produced contains the pentane treating agent and higher hydrocarbons together with small quantities of alcohol. This extract is withdrawn as overheads from column 11 through line 17. The raffinate from column 11 contains a mixture of aqueous alcohol and small quantities of pentane. The raffinate thus obtained is withdrawn as bottoms from column 11 through line 14 for further treatment in the process hereinafter described.

The extract from column 11 containing pentane and higher hydrocarbons, together with small quantities of alcohol, is transferred through line 17 to a low point in a distillation column 18. Column 18 is heated under conditions effective to distill overhead pentane and small quantities of alcohol present, as pentane-alcohol azeotropes which are withdrawn through line 20. Bottoms from column 18, comprising heavy hydrocarbons, are withdrawn through line 19 for further use or treatment outside the scope of the present process.

To facilitate the separation of hydrocarbons from alcohol, overheads from column 18 comprising pentane-alcohol azeotropes are transferred through line 20 into a mixer 21. Mixer 21 is provided to intimately mix a relatively small amount of water with the pentane-alcohol mixture. Water thus employed is introduced through line 21a. The resulting mixture is then transferred through line 22 to a settler 23. In settler 23, by means of settling action, the aqueous pentane-alcohol mixture is separated into an upper phase, comprising pentane, which is withdrawn overhead through line 24 and a lower phase, comprising aqueous alcohol containing small quantities of pentane, which is withdrawn as bottoms through line 25.

The upper phase from settler 23 comprising pentane, is transferred through line 24 into column 11 for further use of the pentane treating agent. Make-up pentane is introduced into line 24 through line 13. Built-up pressure in line 24, caused by accumulation of pentane and lighter hydrocarbons, is released through line 24a, functioning as a vent.

The lower phase from settler 23 comprising aqueous alcohol containing small quantities of pentane, is transferred through line 25 into line 14 with which line 25 connects. In line 14, the alcohol-pentane lower phase from settler 23 is combined with the alcohol-pentane raffinate obtained from column 11, as described above. The combined stream thus obtained in line 14, comprises aqueous alcohol containing small quantities of pentane. This stream is transferred through line 14 to a low point in a distillation column 15 to effect removal of pentane treating agent from the aqueous alcohol stream. In column 15 the mixture of aqueous alcohol and pentane is heated to distill overhead pentane-alcohol azeotropes which are withdrawn through line 26 for further use or treatment in the process hereinafter described. The pentane-free raffinate, comprising aqueous alcohol, hydrocarbon-free, is withdrawn as bottoms from column 15 through line 16.

The depentanized raffinate from column 15 will comprise all the normal alcohols present in the initial aqueous alcohol stream containing hydrocarbons introduced into column 11 through line 10. This aqueous alcohol stream, hydrocarbon-free, may next be passed through a conventional series of alcohol fractionation steps, where in the manner known to those skilled in the art, an ultimate recovery of individual alcohols may be effected. Where the initial alcohol stream entering column 11 through line 10 comprises in addition to alcohols present, acetone, methyl ethyl ketone and higher ketones, the latter may also be passed through conventional fractionation steps to effect their subsequent recovery when obtained as the depentanized raffinates through line 16, following distillation in column 15. In this respect, it should be noted that in order to avoid forming the acetone-methanol azeotrope, methanol may be recovered by distillation at approximately 350 pounds per square inch absolute. Below this pressure acetone-methanol azeotropes are formed. Acetone may be removed by the usual method of simple fractionation, and by similar means, ethanol may be obtained as its azeotrope with water and then recovered by ordinary separation processes to effect recovery of non-aqueous ethanol. Where methyl ethyl ketone is present and its removal from ethanol is desired, separation can be effected by distillation at approximately 60 pounds per square inch absolute, ethanol being taken overhead.

The lower phase from settler 23, comprising aqueous alcohol containing small quantities of pentane and withdrawn through line 25, may be transferred into line 27 with which line 25 connects. The aqueous alcohol-pentane mixture in line 27 may then be transferred into line 10 to combine with the aqueous alcohol solution containing hydrocarbons entering column 11 through line 10 for further use in the process described above. Such a step effects the introduction of the pentane treating agent directly into the aqueous alcohol-hydrocarbon solution which is to be treated. This is advantageous in effecting reduction of the solubility of pentane in column 11 and thereby reduces the quantities of fresh pentane required for treatment in the process described above.

Pentane-alcohol azeotropes obtained as overheads from column 15 in the process described, are transferred through line 26 into line 20 with which line 26 connects. In line 20, the pentane-alcohol azeotropes thus obtained from column 15 are combined with pentane-alcohol azeotropes obtained as overheads from column 18 withdrawn through line 20. The combined pentane-alcohol mixture thus obtained, is transferred through line 20 into mixer 21 for further treatment in accordance with the process hereinbefore described.

The selection of a hydrocarbon treating agent to carry out the previously described function, is dependent upon employing a hydrocarbon having a boiling point, or forming an alcohol azeotrope boiling substantially lower than that of the lightest alcohol present from which hydrocarbon impurities are to be removed. It may also be desirable to use a hydrocarbon or a mixture of hydrocarbons so high-boiling that it will not form an azeotrope with any of the alcohols subjected to treatment. This may have a marked advantage, since such a hydrocarbon or mixture of hydrocarbons would be relatively insoluble in the aqueous alcohol solution, and instead of effecting the distillation of large quantities of solvent, it would only be necessary to strip out the small quantities of extracted hydrocarbons. The use of these heavy hydrocarbons requires the distillation of aqueous alcohols from the dissolved solvent or the carrying of dissolved solvent through to the end of individual alcohol recoveries, before the recovery of the solvent for reuse.

To illustrate the purification obtained in the separation of dissolved hydrocarbon impurities from aqueous solutions of oxygenated organic compounds that form azeotropes with such hydrocarbons, portions of an aqueous solution of ethanol (80%) were saturated with various mixtures of hydrocarbons. Some of these saturated solutions were next subjected to extraction treatment for removal of hydrocarbons, with a one-third volume of normal pentane for each batch. Samples of solutions subjected to extraction, and samples of solutions that were not subjected to extraction were separately distilled in a small fractionating column. Each cut was then tested for hydrocarbon content by adding water and noting the cloudiness of the resultant mixture. It was apparent, that distillates from the pentane-extracted alcohols were free of hydrocarbons. This was further borne out by a comparative study of representative refractive indices of extracted and unextracted charges.

To recapitulate, this invention is particularly directed to a process for the separation of dissolved hydrocarbon impurities from aqueous solutions of oxygenated organic compounds that form azeotropes with hydrocarbons where such compounds are present in the reaction product obtained in the catalytic hydrogenation of carbon monoxide. It should be noted, however, that the process of the invention may also be applied without modification, to effect efficient and economical separation of such impurities from any aqueous solution of oxygenated organic compounds that form azeotropes with hydrocarbons, where such compounds comprise water-soluble organic compounds containing a polar group. Hence, the invention may also be effectively applied in the separation of hydrocarbons from aqueous solutions of alcohol-ketone mixtures or aqueous ketone or acid solutions.

In addition, while I have described a particular embodiment of my invention for purposes of illustration, it should be understood that various modifications and adaptations thereof, which will be obvious to one skilled in the art, may be made within the spirit of the invention as set forth in the appended claims.

I claim:

1. A process for separating hydrocarbons from an aqueous solution of water-soluble oxygenated organic compounds containing a polar group which comprises: subjecting said solution to extraction with a relatively low-boiling hydrocarbon as a solvent to obtain an extract containing hydrocarbons and a raffinate containing oxygenated organic compounds and solvent; separately subjecting at least a portion of said extract to distillation to obtain a relatively high-boiling fraction containing hydrocarbons and a relatively low-boiling azeotropic fraction containing solvent and oxygenated organic compounds; separately subjecting at least a portion of said raffinate to distillation to obtain a relatively high-boiling fraction containing oxygenated organic compounds and substantially free from hydrocarbons, and a relatively low-boiling azeotropic fraction containing solvent and oxygenated organic compounds; combining said azeotropic fractions; water-washing mixed solvent and oxygenated organic compounds obtained from the azeotropic fractions thus combined to form an aqueous phase comprising oxygenated organic compounds and a hydrocarbon phase comprising solvent; separating said phases; combining at least a portion of said aqueous phase with further quantities of said raffinate for further treatment in said last-mentioned distillation step; transferring the mixture thus combined to said last-mentioned distillation step, and recycling said hydrocarbon phase to said extraction step for further treatment therein in combination with said first-mentioned solution.

2. A process for separating hydrocarbons from an aqueous solution of water-soluble oxygenated organic compounds containing a polar group which comprises: subjecting said solution to extraction with a relatively low-boiling hydrocarbon as a solvent to obtain an extract containing hydrocarbons and a raffinate containing oxygenated organic compounds and solvent; separately subjecting at least a portion of said extract to distillation to obtain a relatively high-boiling fraction containing hydrocarbons and a relatively low-boiling azeotropic fraction containing solvent and oxygenated organic compounds; separately subjecting at least a portion of said raffinate to distillation to obtain a relatively high-boiling fraction containing oxygenated organic compounds and substantially free from hydrocarbons, and a relatively low-boiling azeotropic fraction containing solvent and oxygenated organic compounds; combining said azeotropic fractions; water-washing mixed solvent and oxygenated organic compounds obtained from the azeotropic fractions thus combined to form an aqueous phase comprising oxygenated organic compounds and a hydrocarbon phase comprising solvent; separating said phases; combining at least a portion of said aqueous phase with further quantities of said raffinate for further treatment in said last-mentioned distillation step; transferring the mixture thus combined to said last-mentioned distillation step; and separately recycling said hydrocarbon phase and at least a portion of said aqueous phase to said extraction step.

3. A process for separating hydrocarbons from an aqueous solution of water-soluble oxygenated organic compounds containing a polar group which comprises: subjecting said solution to extraction with a relatively low-boiling hydrocarbon as a solvent to obtain an extract containing hydrocarbons and a raffinate containing oxygenated organic compounds and solvent; separately subjecting at least a portion of said extract to distillation to obtain a relatively high-boiling fraction containing hydrocarbons and a relatively low-boiling azeotropic fraction containing solvent and oxygenated organic compounds; separately subjecting at least a portion of said raffinate to distillation to obtain a relatively high-boiling fraction containing oxygenated organic compounds and substantially free from hydrocarbons, and a relatively low-boiling azeotropic fraction containing solvent and oxygenated organic compounds; water-washing mixed solvent and oxygenated organic compounds obtained from at least one of said azeotropic fractions to form an aqueous phase comprising oxygenated organic compounds and a hydrocarbon phase comprising solvent; and separating said phases.

4. A process for separating hydrocarbons from an aqueous solution of water-soluble oxygenated organic compounds containing a polar group which comprises: subjecting said solution to extraction with a relatively low-boiling hydrocarbon as a solvent to obtain an extract containing hydrocarbons and a raffinate containing oxygenated organic compounds and solvent; separately subjecting at least a portion of said extract to distillation to obtain a relatively high-boiling fraction containing hydrocarbons and a relatively low-boiling azeotropic fraction containing solvent and oxygenated organic compounds; separately subjecting at least a portion of said raffinate to distillation to obtain a relatively high-boiling fraction containing oxygenated organic compounds and substantially free from hydrocarbons, and a relatively low-boiling azeotropic fraction containing solvent and oxygenated organic compounds; water-washing mixed solvent and oxygenated organic compounds obtained from the azeotropic fraction produced from the distillation of said extract to form an aqueous phase comprising oxygenated organic compounds and a hydrocarbon phase comprising solvent; and separating said phases.

5. A process for separating hydrocarbons from an aqueous solution of water-soluble oxygenated organic compounds containing a polar group which comprises: subjecting said solution to extraction with a relatively low-boiling hydrocarbon as a solvent to obtain an extract containing hydrocarbons and a raffinate containing oxygenated organic compounds and solvent; separately subjecting at least a portion of said extract to distillation to obtain a relatively high-boiling fraction containing hydrocarbons and a relatively low-boiling azeotropic fraction containing solvent and oxygenated organic compounds; separately subjecting at least a portion of said raffinate to distillation to obtain a relatively high-boiling fraction containing oxygenated organic compounds and substantially free from hydrocarbons, and a relatively low-boiling azeotropic fraction containing solvent and oxygenated organic compounds; water-washing mixed solvent and oxygenated organic compounds obtained from the azeotropic fraction produced from the distillation of said raffinate to form an aqueous phase comprising oxygenated organic compounds and a hydrocarbon phase comprising solvent; and separating said phases.

6. A process for separating hydrocarbons from an aqueous solution of water-soluble oxygenated organic compounds containing a polar group which comprises: subjecting said solution to extraction with a relatively low-boiling hydrocarbon as a solvent to obtain an extract containing hydrocarbons and a raffinate containing oxygenated organic compounds and solvent; separately subjecting at least a portion of said extract to distillation to obtain a relatively high-boiling fraction containing hydrocarbons and a relatively low-boiling azeotropic fraction containing solvent and oxygenated organic compounds; separately subjecting at least a portion of said raffinate to distillation to obtain a relatively high-boiling fraction containing oxygenated organic compounds and substantially free from hydrocarbons, and a relatively low-boiling azeotropic fraction containing solvent and oxygenated organic compounds; combining said azeotropic fractions; water-washing mixed solvent and oxygenated organic compounds obtained from the azeotropic fractions thus combined to form an aqueous phase comprising oxygenated organic compounds and a hydrocarbon phase comprising solvent; and separating said phases.

7. A process for separating hydrocarbons from an aqueous solution of water-soluble oxygenated organic compounds containing a polar group which comprises: subjecting said solution to extraction with a relatively low-boiling hydrocarbon as a solvent to obtain an extract containing hydrocarbons and a raffinate containing oxygenated organic compounds and solvent; separately subjecting at least a portion of said extract to distillation to obtain a relatively high-boiling fraction containing hydrocarbons and a relatively low-boiling azeotropic fraction containing solvent and oxygenated organic compounds; separately subjecting at least a portion of said raffinate to distillation to obtain a relatively high-boiling fraction containing oxygenated organic compounds and substantially free from hydrocarbons, and a relatively low-boiling azeotropic fraction containing solvent and oxygenated organic compounds; combining said azeotropic fractions; water-washing mixed solvent and oxygenated organic compounds obtained from the azeotropic fractions thus combined to form an aqueous phase comprising oxygenated organic compounds and a hydrocarbon phase comprising solvent; combining at least a portion of said aqueous phase with further quantities of said raffinate for further treatment in said last-mentioned distillation step; and transferring the mixture thus combined to said last-mentioned distillation step.

8. The process of claim 3 wherein the solvent is a hydrocarbon boiling at a temperature within the range from about −7° C. to about 160° C.

9. The process of claim 3 wherein the solvent is butane.

10. The process of claim 3 wherein the solvent is pentane.

11. The process of claim 3 wherein the solvent is heptane.

12. A process for separating hydrocarbons from an aqueous solution of water-soluble oxygenated organic compounds containing a polar group which comprises: subjecting said solution to extraction with a relatively low-boiling hydrocarbon solvent to obtain an extract containing hydrocarbons and a raffinate containing oxygenated organic compounds and solvent; separately subjecting at least a portion of said extract to distillation to obtain a relatively high-boiling fraction containing hydrocarbons and a relatively low-boiling azeotropic fraction containing solvent and oxygenated organic compounds; separately subjecting at least a portion of said raffinate to distillation to obtain a relatively high-boiling fraction containing oxygenated organic compounds and substantially free from hydrocarbons, and a relatively low-boiling azeotropic fraction containing solvent and oxygenated organic compounds; water-washing mixed solvent and oxygenated organic compounds obtained from at least one of said azeotropic fractions to form an aqueous phase comprising oxygenated organic compounds and a hydrocarbon phase comprising solvent; recycling said aqueous phase to said last-mentioned distillation step; and recycling said hydrocarbon phase to said extraction step for treatment therein in combination with said first-mentioned solution.

13. A process for separating hydrocarbons from an aqueous solution of water-soluble oxygenated organic compounds containing a polar group which comprises: subjecting said solution to extraction with a relatively low-boiling hydrocarbon solvent to obtain an extract containing hydrocarbons and a raffinate containing oxygenated organic compounds and solvent; separately subjecting at least a portion of said extract to distillation to obtain a relatively high-boiling fraction containing hydrocarbons and a relatively low-boiling azeotropic fraction containing solvent and oxygenated organic compounds; separately subjecting at least a portion of said raffinate to distillation to obtain a relatively high-boiling fraction containing oxygenated organic compounds and substantially free from hydrocarbons, and a relatively low-boiling azeotropic fraction containing solvent and oxygenated organic compounds; water-washing mixed solvent and oxygenated organic compounds obtained from the azeotropic fraction produced from the distillation of said extract to form an aqueous phase comprising oxygenated organic compounds and a hydrocarbon phase comprising solvent; recycling said aqueous phase to said last-mentioned distillation step; and recycling said hydrocarbon phase to said extraction step for treatment therein in combination with said first-mentioned solution.

14. A process for separating hydrocarbons from an aqueous solution of water-soluble oxygenated organic compounds containing a polar group which comprises: subjecting said solution to extraction with a relatively low-boiling hydrocarbon solvent to obtain an extract containing hydrocarbons and a raffinate containing oxygenated organic compounds and solvent; separately subjecting at least a portion of said extract to distillation to obtain a relatively high-boiling fraction containing hydrocarbons and a relatively low-boiling azeotropic fraction containing solvent and oxygenated organic compounds; separately subjecting at least a portion of said raffinate to distillation to obtain a relatively high-boiling fraction containing oxygenated organic compounds and substantially free from hydrocarbons, and a relatively low-boiling azeotropic fraction containing solvent and oxygenated organic compounds; water-washing mixed solvent and oxygenated organic compounds obtained from the azeotropic fraction produced from the distillation of said raffinate to form an aqueous phase comprising oxygenated organic compounds and a hydrocarbon phase comprising solvent; recycling said aqueous phase to said last-mentioned distillation step; and recycling said hydrocarbon phase to said extraction step for further treatment therein in combination with said first-mentioned solution.

15. A process for separating hydrocarbons from an aqueous solution of water-soluble oxygenated organic compounds containing a polar group which comprises: subjecting said solution to extraction with a relatively low-boiling hydrocarbon solvent to obtain an extract containing hydrocarbons and a raffinate containing oxygenated organic compounds and solvent; separately subjecting at least a portion of said extract to distillation to obtain a relatively high-boiling fraction containing hydrocarbons and a relatively low-boiling azeotropic fraction containing solvent and oxygenated organic compounds; separately subjecting at least a portion of said raffinate to distillation to obtain a relatively high-boiling fraction containing oxygenated organic compounds and substantially free from hydrocarbons, and a relatively low-boiling azeotropic fraction containing solvent and oxygenated organic compounds; combining said azeotropic fractions; water-washing mixed solvent and oxygenated organic compounds obtained from the azeotropic fractions thus combined to form an aqueous phase comprising oxygenated organic compounds and a hydrocarbon phase comprising solvent; recycling said aqueous phase to said last-mentioned distillation step; and recycling said hydrocarbon phase to said extraction step for further treatment therein in combination with said first-mentioned solution.

ERNEST SOLOMON.

REFERENCES CITED

The following references are of record in the file of this patent:

UNITED STATES PATENTS

| Number | Name | Date |
| --- | --- | --- |
| 2,083,125 | Scheuble | June 8, 1937 |
| 2,274,750 | Soenksen et al. | Mar. 3, 1942 |